United States Patent [19]
Mochizuki

[11] Patent Number: 5,065,293
[45] Date of Patent: Nov. 12, 1991

[54] HEADLAMP FOR AUTOMOBILES

[75] Inventor: Hideharu Mochizuki, Shizuoka, Japan

[73] Assignee: Koito Manufacturing Co., Ltd., Tokyo, Japan

[21] Appl. No.: 673,548

[22] Filed: Mar. 22, 1991

[30] Foreign Application Priority Data

Mar. 23, 1990 [JP] Japan .................. 2-72199
Nov. 30, 1990 [JP] Japan .................. 2-334383

[51] Int. Cl.$^5$ .............................. F21V 21/26
[52] U.S. Cl. ............................. 362/273; 362/287; 362/61
[58] Field of Search .................. 362/287, 61, 273

[56] References Cited

U.S. PATENT DOCUMENTS

| | | | |
|---|---|---|---|
| 1,609,634 | 12/1926 | Ryan . | |
| 4,731,706 | 3/1988 | Ricard . | |
| 4,922,387 | 5/1990 | Ryder et al. . | |
| 4,928,215 | 5/1990 | Fujiho et al. ............ | 362/61 |
| 5,003,436 | 3/1991 | Yamada et al. ........... | 362/61 |

*Primary Examiner*—Carroll B. Dority
*Attorney, Agent, or Firm*—Sughrue, Mion, Zinn, Macpeak & Seas

[57] ABSTRACT

An automobile headlamp which indicates the inclination of the tilting member of the headlamp (the reflector in a movable-reflector type headlamp and the lamp body and reflector unit in a movable-unit type headlamp) in relation to the base member (the lamp body in a movable-reflector type headlamp and the lamp housing in a movable-unit type headlamp) in terms of a change on the scale on an inclination measuring device installed between an aiming screw and the base member. The inclination measuring device includes a guide member supported on the base member and extending approximately in parallel with a protruding portion of the rightward-leftward direction aiming screw. A sliding member is threadedly engaged with the protruding portion of aiming screw such that the sliding member slides relative to the guide member as the aiming screw is rotated. A linear scale formed on the guide member indicating an amount of relative displacement between the guide member and a reference mark on the sliding member. If desired, a similar inclination measuring device can be provided on the upward-downward direction aiming screw to indicate the amount of inclination of the tilting member in the upward-downward direction.

15 Claims, 11 Drawing Sheets

HEADLAMP FOR AUTOMOBILES

BACKGROUND OF THE INVENTION

The present invention relates to an automotive headlamp which is provided with a measuring device for ascertaining whether or not the rightward-leftward irradiating direction of the headlamp, namely, the irradiating angle of the lamp in the rightward-leftward direction, is in its normal and prescribed position, and which is capable of readily making adjustment, in case the irradiating angle of the headlamp is not in the prescribed position, in such a manner that the irradiating angle of the headlamp in the rightward-leftward direction may be set in the prescribed position.

A conventional automotive headlamp will be described with reference to an example of a movable-reflector type headlamp, in which a reflector is supported in a manner permitting its tilting motion within the lamp body. As illustrated in FIG. 1, the rear surface side of a reflector 402 is supported in relation to a lamp body 401 by three points, namely, by two aiming screws 403 and 404, which extends forward and rearward, and one swing support point 405. Moreover as seen in FIG. 1, which shows the reflector as seen from the front, the aiming screws 403 and 404 extend in the vertical direction. The aiming screws 403 and 404 are supported in a manner permitting their rotational motion on the rear surface wall of the lamp body 401, and the supporting point provided by the aiming screws 403 and 404 to the reflector 402 is arranged, for example, at right angles in relation to the swing support point 405. Thus, the headlamp is designed to allow adjustment of the irradiating angle of the lamp by tilting the reflector 402 around the horizontal axis Lx and the vertical axis Ly by the aiming screws 403 and 404. In this regard, reference numeral 406 indicates an electric bulb, which is a light source mounted in the reflector 402.

Also in a movable-unit type headlamp, in which a lamp body and reflector unit comprised of a reflector formed in a construction integrated with the inside circumferential surface of the lamp body is supported in a manner permitting its tilting motion in relation to the lamp housing, has a construction (though not illustrated in any figure) in which the lamp body and reflector unit is supported with one swing support point and two aiming screws, as is the case with the movable-reflector type headlamp. Thus, it is designed to permit adjustment of the irradiating angle of the lamp by tilting the lamp body and reflector unit by rotating the aiming screws.

Thus, headlamps for use on automobiles are designed to allow adjustments of their irradiating angle by tilting a tilting member provided with a light reflecting surface which sets the irradiating direction of the lamp (such a tilting member being the reflector in a movable-reflector type headlamp and a lamp body and the reflector unit in a movable-reflector unit type headlamp) in the upward-downward direction (around the horizontal axis) and in the rightward-leftward direction (around the vertical axis) in relation to the base member (such a base member being a lamp body in a movable-reflector type headlamp and a lamp housing in a movable-unit type headlamp) by rotating the two aiming screws.

Then, recently various proposals have been made to allow for easily measuring the irradiating angle of the lamp in the rightward-leftward direction. Commonly assigned U.S. patent applications, Ser. Nos. 07/370,949 and 07/508,751, unexamined Laid-Open Japanese Utility Model Application (OPI) No. Sho. 63-8397, Japanese Utility Model Application (OPI) No. Sho. 63-21576, etc., describe earlier proposals made by the present applicant.

However, the series of proposals which have been made to the present time are for a construction in which a measuring device for measuring the inclination of the tilting member in the rightward-leftward direction is provided chiefly between the tilting member and the base member, and generally wherein the installation of such a measuring device in an upper position of the lamp is done for convenience in reading the calibration on the measuring device. This presents a problem in that such an arrangement results in a larger upward-downward size of the lamp, which is contrary to the contemporary demand in favor of headlamps with a small upward-downward size. Above all, the movable-reflector type headlamps, which have such a measuring device arranged within the lamp body, present an additional problem that the construction causes inconvenience in reading the calibration.

Also, in commonly assigned U.S. patent application, Ser. No. 07/370,949 a construction having a measuring device with the calibrated part protruding into the area in the rear part of the base member is proposed, but such a construction presents the problem that it requires holes to be formed in the base member for the installation of a measuring device, which in its turn results in troublesome processing work and additionally calls for troublesome adjustment on the occasion when such a measuring device is assembled into the lamp.

SUMMARY OF THE INVENTION

The present invention has been made in view of the problems described hereinabove, and an object of the invention is to provide an automobile headlamp which can achieve a thinner upward-downward size without any special processing on the base member for the installation of a measuring device, which measures the inclination of the irradiating angle of the headlamp in the rightward-leftward direction.

For the purpose of attaining the object described above, the invention provides a movable tilting-member type headlamp for use on automobiles which adjusts the irradiating angle of the headlamp with a tilting member having a light reflecting surface for setting the irradiating direction of the lamp, the tilting member being supported at three points, namely one swing support part, a rightward-leftward direction aiming screw penetrating through the base member in the forward-rearward direction and supported on the base member, and an aiming screw for the upward-downward direction and being moved aslant in the upward-downward direction and also in the rightward-leftward direction in relation to the base member by a rotating the aiming screws, wherein the headlamp for is comprised of an inclination measuring device which, being set between the base member and the protrusion of the above-mentioned rightward-leftward direction aiming screw into the rear part of the base member, measures the rightward-leftward inclination of the tilting member and the above-mentioned inclination measuring device is comprised of a guide member supported on the base member and extending approximately in parallel with the protrusion of the above-mentioned rightward-leftward direction aiming screw into the rear area of the base member, a sliding member threadedly engaged with the part of the above-mentioned rightward-leftward direction aiming screw protruding into the rear area of the base member and also set in a manner permitting its sliding motion with the above-mentioned guide member, and a scale formed in a prescribed position between the above-mentioned guide member and the above-mentioned sliding member and indicating the relative displacement of the two.

The sliding member is preferably comprised of an aiming screw holding nut threadedly engaged with the rightward-leftward direction aiming screw, a sliding case set in a manner permitting its sliding motion with both of the above-mentioned aiming screw holding nut and the above-mentioned guide member, and a zero point adjusting screw supported with the above-mentioned sliding case in a manner permitting its rotating motion and arranged in parallel with the above-mentioned aiming screw, and further threadedly engaged with a second female screw part formed on the above-mentioned aiming screw holding nut.

Moreover, in accordance with another aspect of the invention, the sliding member is comprised of an aiming screw holding nut threadedly engaged with the rightward-leftward direction aiming screw, a sliding case set in a manner permitting its sliding motion with both of the above-mentioned aiming screw holding nut and the above-mentioned guide member, and a zero point adjusting shaft supported with the above-mentioned sliding case in a manner permitting its rotating motion and provided in such a manner as to protrude upward and provided with a pinion meshing with a rack formed on the above-mentioned aiming screw holding nut.

If desired, a similar inclination measuring device can be provided on the upward-downward aiming screw.

The invention can be applied to movable-reflector type headlamp of which the base member is a lamp body and the tilting member is a reflector capable of moving aslant within the lamp body.

The invention can also be applied to a movable-unit type headlamp of which the base member is a lamp housing and the tilting member is a lamp body reflector unit in a unified construction with a reflector formed on the inside circumferential surface.

As the rightward-leftward direction aiming screw is rotated, the tilting member tilts towards the base member (in a tilting motion around the vertical axis, which is the central axis for the tilting motion), and the sliding member slides in the forward-rearward direction along the guide member. Then, the amount of inclination of the tilting member which occurs in relation to the base member by the rotating motion of the rightward-leftward direction aiming screw (that is, the amount of movement which the point at which the tilting member is supported by the rightward-leftward direction aiming screw makes along the aiming screw) is in proportion to the amount of movement of the sliding member in relation to the guide member, and the amount of inclination of the tilting member in relation to the base member, namely, the amount of deviation of the irradiating angle of the headlamp in the rightward-leftward direction, is manifest as a change on the scale between the sliding member threadedly engaged with the rightward-leftward direction aiming screw and the guide member protruding forth as supported by the base member. Thus, from such changes on this scale, it is possible to judge whether or not the irradiating angle of the headlamp in the rightward-leftward direction is proper, and also what the amount of such a deviation is in case the irradiating angle is not proper. Also, in case there is any deviation, the irradiating angle can be adjusted by turning the rightward-leftward direction aiming screw in such a manner that such a deviation on the scale is eliminated.

Moreover, the inclination measuring device, which is comprised of a guide member and a sliding member, has a construction in which the inclination measuring device is set between the base member and the protruding part of the rightward-leftward direction aiming screw from the rear area of the base member, and no processing work at all is required on the base member for the arrangement and installation of the inclination measuring device. Also, owing to the arrangement of the inclination measuring device in the rear area of the base member, the upward-downward size (height) of the headlamp is reduced.

The position of the zero point can be adjusted easily by rotating the zero point adjusting screw arranged in parallel with the rightward-leftward direction aiming screw, or by sliding the sliding case, which is a part of the sliding member, in relation to the guide member by the rotating operation applied to the zero point adjusting shaft protruding in the area above the sliding case.

DESCRIPTION OF THE PREFERRED EMBODIMENTS

Preferred embodiments of the present invention will now be described with reference to the accompanying drawings.

Figure 1:
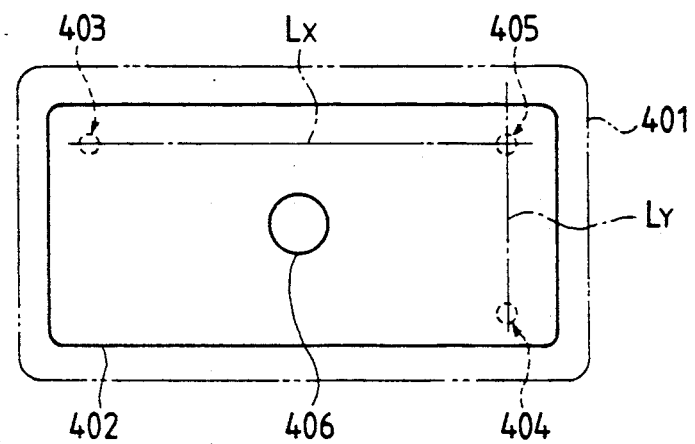
FIG. 1 presents ar illustrative drawing which shows the reflector supporting structure in a movable-reflector type headlamp.
Figure 2:
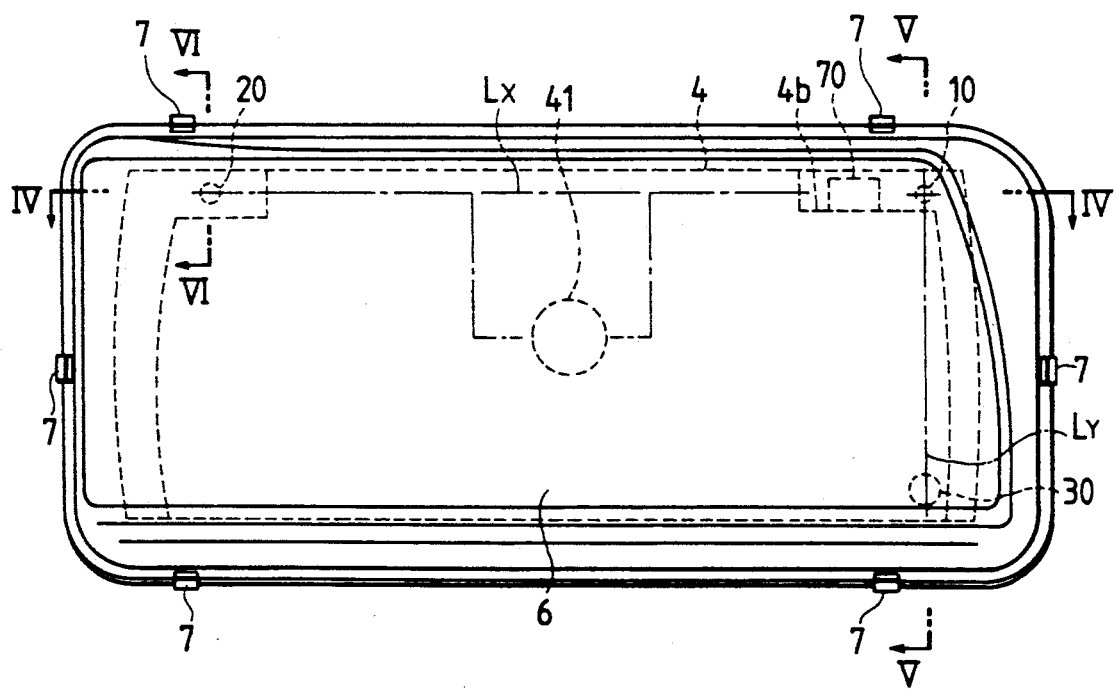
FIG. 2, which illustrates an example of preferred embodiments in which the present invention has been applied to a movable-reflector type headlamp, is a front view of the lamp.
Figure 3:
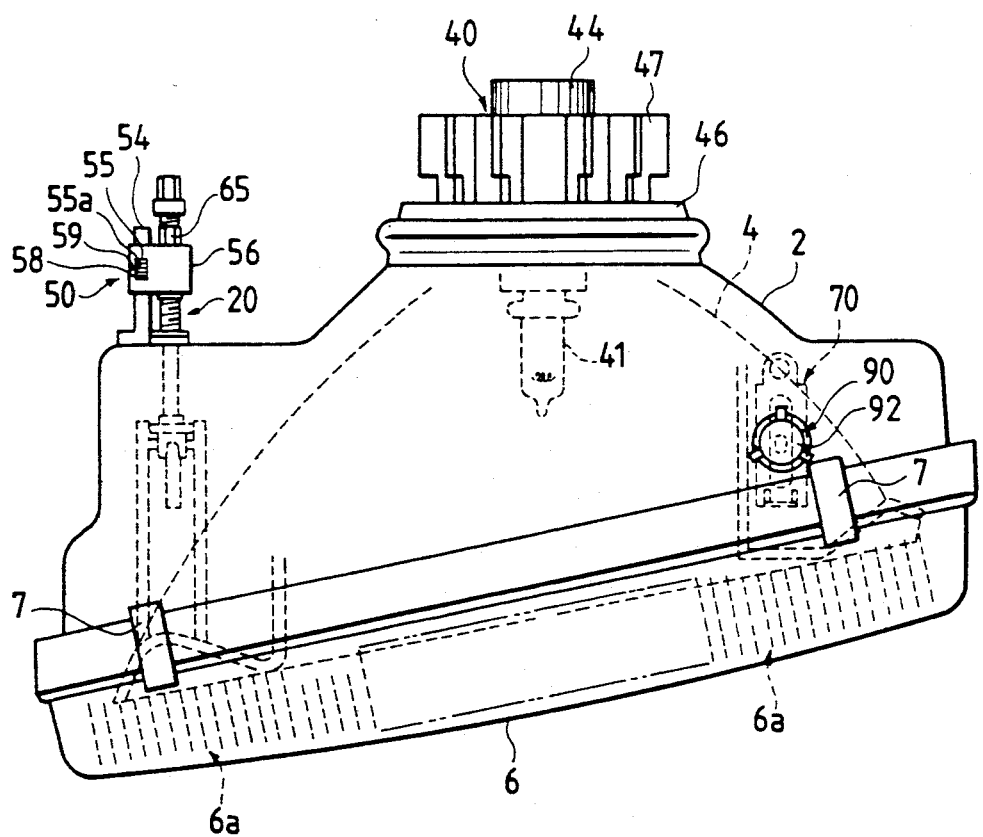
FIG. 3 is a plane view of the same lamp.
Figure 4:
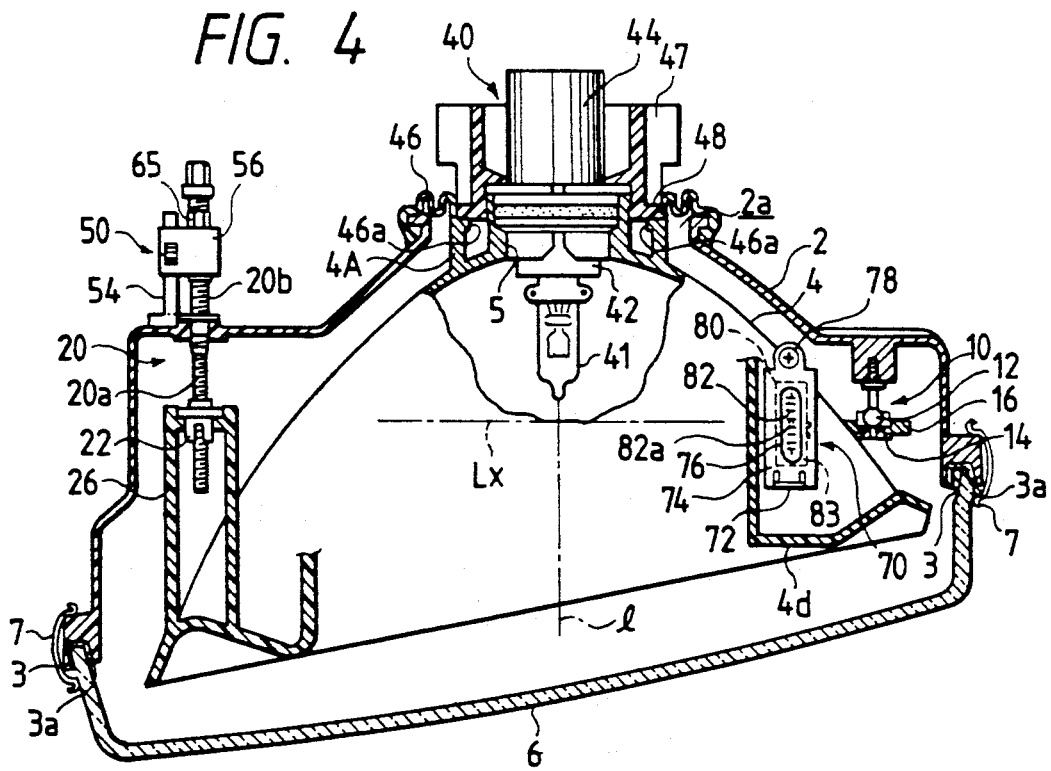
FIG. 4 shows a sectional view of the same headlamp as seen along the line IV-IV shown in FIG.
Figure 5:
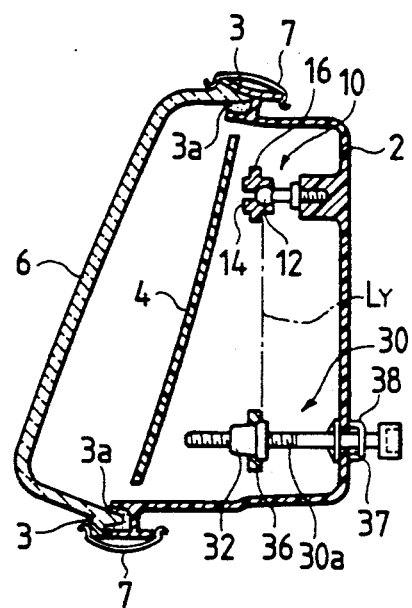
FIG. 5 is a sectional view of the same lamp along the line V—V shown in FIG. 2.
Figure 6:
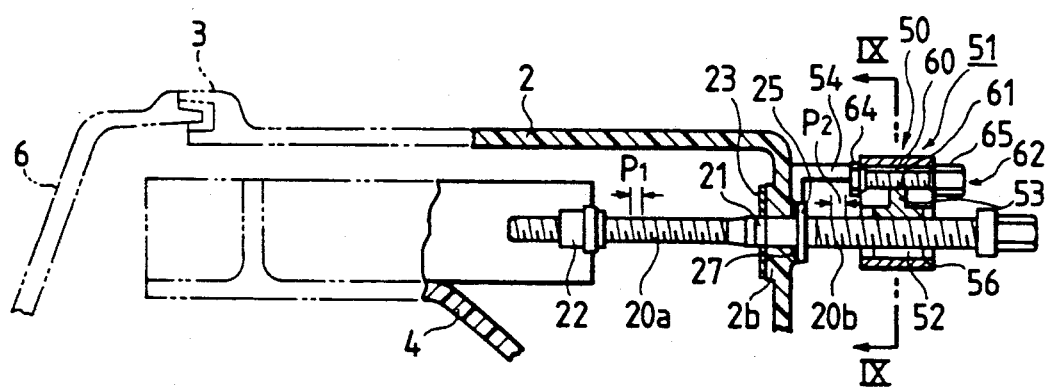
FIG. 6 presents a vertical sectional view of the part of the area in the proximity of the position for the installation of the inclination measuring device which measures the irradiating angle of the headlamp in the rightward-leftward direction (an enlarged sectional view of the inclination measuring device along the line VI—VI shown in FIG. 2)
Figure 7:
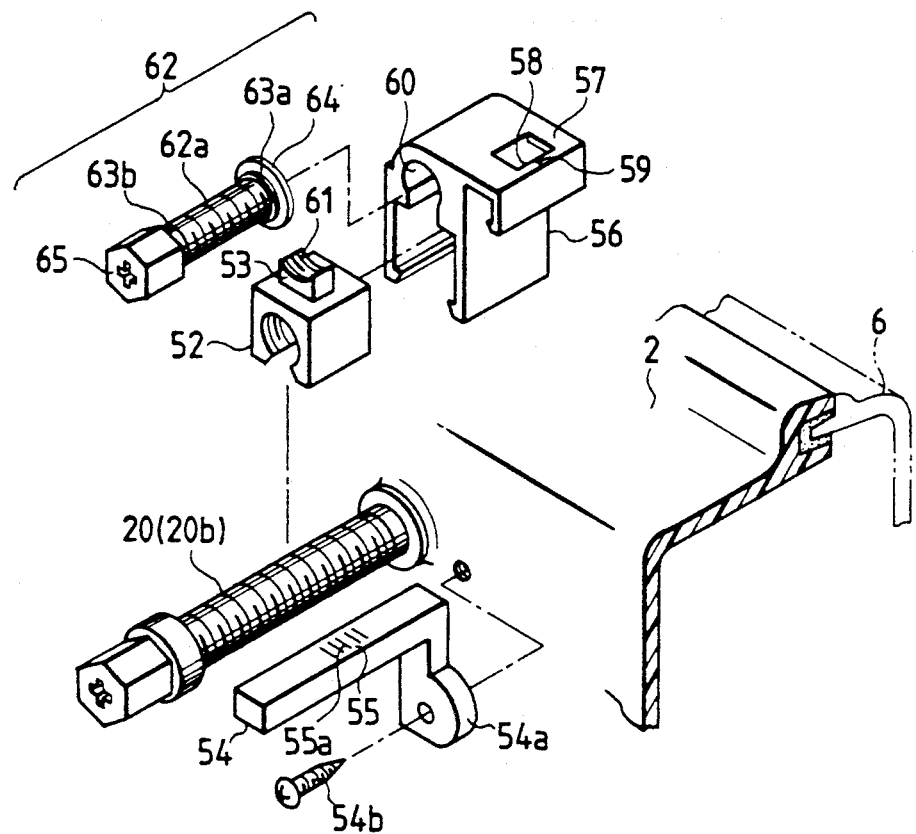
FIG. 7 is a disassembled oblique view of the same inclination measuring device.
Figure 8:
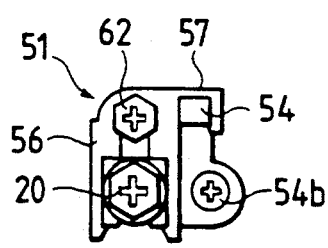
FIG. 8 is a rear view of the same inclination measuring device.
Figure 9:
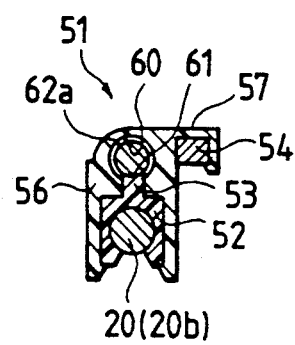
FIG. 9 is a horizontal sectional view of the same inclination measuring device (a sectional view of the measuring device along the line IX—IX shown in FIG. 6)

FIGS. 2 through FIG. 9 illustrate preferred embodiments in which the present invention is applied to a movable-reflector type headlamp, of which the base member is a lamp body and the tilting member is a reflector. FIG. 2 presents a front view of a movable-reflector type headlamp with an irradiating angle adjusting device installed therein. FIG. 3 is a plane view of the same lamp. FIG. 4 is a horizontal sectional view of the same lamp (a sectional view illustrating the lamp along the line IV—IV shown in FIG. 2). FIG. 5 is a vertical sectional view of the same lamp (a sectional view illustrating the lamp along the line V—V shown in FIG. 2). FIG. 6 is a vertical sectional view illustrating the area around the position for the arrangement of an inclination measuring device, which measures the inclination of the irradiating angle of the headlamp in the rightward-leftward direction (an enlarged sectional view illustrating the lamp along the line VI—VI shown in FIG. 2). FIG. 7 is a disassembled oblique view of the same inclination measuring device. FIG. 8 is a rear view of the same inclination measuring device. FIG. 9 is a cross-sectional view of the same inclination measuring device (a sectional view illustrating the lamp along the line IX—IX shown in FIG. 6).

In these drawings, reference numeral 2 indicates a lamp body having a generally container shape. A reflector 4 is mounted within the lamp body, and, with a front lens 6 set in the rectangle-shaped front opening in the lamp body, this lamp body is formed into an integrated headlamp unit.

As shown in FIGS. 2, 4 and 5, a reflector 4 is supported at three points, namely, with a ball joint 10, a rightward-leftward direction aiming screw 20, and an upward-downward direction aiming screw 30. The side of the spherical part 12 of the ball joint 10 is supported on the side of the lamp body 2, forming a construction in which the reflector 4 can swing around this ball joint 10 as the center of its swinging motion. Moreover, the aiming screws 20 and 30 are supported on the lamp body 2 in such a manner that they may rotate freely, and the male screw parts 20a and 30a on the forward ends of the aiming screws 20 and 30, respectively, are threadedly engaged with the nuts 22 and 32 on the side of the reflector 4. A socket 14, which bears the spherical part 12, is held rigidly on a bracket 16 formed in protrusion on the rear side of the reflector 4, and the nuts 22 and 32, which are threadedly engaged with the male screw parts 20a and 30a, are held rigidly on brackets 26 and 36 formed in protrusion on the rear side of the reflector 4. Thus, with the rotation of the aiming screws 20 and 30, the nuts 22 and 32 are moved forward and rearward along the aiming screws 20 and 30, and the inclination of the reflector 4 is thereby changed.

In other words, the supporting point formed for the reflector 4 by the rightward-leftward direction aiming screw 20 (the threadedly engaged parts of the aiming screw 20 and the nut 22) is at right angles with the irradiating axis l of the headlamp (see FIG. 4) and is positioned on the horizontal axis Lx, which passes through the ball joint 10, and the supporting point formed for the reflector 4 by the upward-downward direction aiming screw 30 (the threadedly engaged parts of the aiming screw 30 and the nut 32) is at right angles with the irradiating angle l of the headlamp and is positioned on the vertical axis Ly, which passes through the ball joint 10. Consequently, the rotating motion of the aiming screw 20 moves the nut 22 forward and rearward along the screw 20, so that the reflector 4 tilts around the vertical axis Ly, making it possible to adjust the inclination of the reflector 4, which is the tilting member, in relation to the lamp body 2, which is the base member. Thus, the irradiating angle of the headlamp in the rightward-leftward direction can be adjusted. Further, rotation of the aiming screw 30 moves the nut 32 forward and rearward along the screw 30, so that the reflector 4 tilts around the horizontal axis Lx which crosses the vertical axis Ly at right angles, making it possible to adjust the inclination of the reflector 4, which is the tilting member, in relation to the lamp body 2, which is the base member, in the upward-downward direction, namely, the irradiating angle of the headlamp in the upward-downward direction. In this manner, the two aiming screws 20 and 30 make it possible to adjust the inclination of the reflector 4, namely, to adjust the irradiating angle of the headlamp.

Also, in FIG. 4, reference numeral 40 indicates a bulb socket formed into a unified structure with a bulb 41 connected thereto. On the rear side of the lamp body 2, an opening 2a is formed for the attachment and detachment of the bulb socket. Furthermore, on the inside area of this opening 2a on the rear side of the lamp body is positioned a socket hole 5, which is formed in the rear top part of the reflector 4, and the bulb socket 40 is set into this socket hole 5. On the outer circumference of the rear top area of the reflector 4 is set a rubber cover 46, which closes the gap between the reflector 4 and the lamp body 2. Reference numeral 47 denotes a locking cap 47, which exerts pressure onto the bulb socket 40, thereby keeping it securely in the hole 5, for which the forward end outside flange 48 of the locking cap 47 holds the inside circumferential edge 46a of the rubber cover 46 in close contact under pressure with the circumferential wall 4A of the reflector 4. Additionally, reference numeral 42 represents a mouthpiece in which the bulb 41 is set, and the reference numeral 44 indicates a connector part formed in a cylindrical shape with a connecting terminal provided in its inside.

Moreover, in FIG. 2 through FIG. 5, reference numeral 3 denotes a sealing groove formed in the peripheral edge of the front opening in the lamp body 2. With a sealing agent 3a filled inside this sealing groove 3, the legs of the front lens 6 are joined. Reference numeral 7 denotes a clip for mechanically clamping the front lens 6 and the lamp body 2. In this regard, the reference numeral 6a in FIG. 3 indicates a diffusion step formed on the inside circumferential area of the side wall of the front lens 6, this diffusion step serving the purpose of rendering light leaked from the side area of the front lens less conspicuous.

Reference numeral 50 denotes a first inclination measuring device which, being set between the lamp body 2 and the part of the rightward-leftward direction aiming screw 20 which projects into the rear area of the lamp body 2, measures the rightward-leftward inclination of the reflector 4, namely, the rightward-leftward inclination of the irradiating angle of the headlamp. The details of this arrangement are illustrated in FIG. 6 through FIG. 9.

The rightward-leftward direction aiming screw 20 is arranged to penetrate in the forward-rearward direction through the lamp body 2, and is supported on the lamp body 2, being positioned in place as a snap ring 23 set in the necking part 21 of the screw shaft and a flange part 25 formed on the shaft, working together to snap and hold the thicker part 2b of the lamp body. In addition, reference numeral 27 indicates an O-ring, which, being set between the rear surface of the lamp body 2 and the flange part 25, seals the screw supporting part. Also, on the part of the aiming screw 20 which protrudes into the rear area of the lamp body, there is formed a male screw part 20b, which has a pitch ($P_2$) larger than the pitch ($P_1$) of the male screw part 20a on the fore end side of the screw, and a bracket-shaped aiming screw holding nut 52 is threadedly engaged with this male screw part 20b. Also, behind the lamp body 2, a rod-shaped guide member 54 extends in parallel with the above-mentioned rightward-leftward direction aiming screw 20, and a straight-line scale 55 extending in the direction of the extension of the guide member 54 is placed on the upper side area of the guide member 54. Reference numeral 55a indicates the zero point on the scale 55. Reference numeral 54a denotes a bracket part on the guide member 54, and reference numeral 54b denotes a mounting screw, which mounts and fixes the guide member 54 on the lamp body 2.

Moreover, a sliding case 56, having approximately a gate shape, is set on both of the screw holding nut 52 and the guide member 54, and the sliding case 56 is constructed so that it can slide in the forward-rearward direction in relation to the screw holding nut 52 and the guide member 54. Reference numeral 57 denotes a horizontal arm which forms a part of the sliding case 56 and engages itself with the guide member 54. In this horizontal arm 57 is formed a rectangle-shaped opening 58, which exposes the area of the guide member 54 where the scale is formed, and a reference point 59, which corresponds to the scale 55 on the guide member side is indicated on the edge of a side of the opening. The sliding case 56 is formed, for example, of synthetic resin by monobloc molding.

The sliding case 56 has a through-hole 60 formed therein with an opening formed at the side of the part in engagement with the screw holding nut 52, and a zero point adjusting screw 62 is provided in this through-hole 60. In addition, a female screw part 61 is formed on the upper end part of the upward protrusion 53 of the screw holding nut 52 set up with the sliding case 56, which forms a construction with the zero point adjusting screw threadedly engaged with this female screw part 61. That is, straight parts 63a and 63b slightly larger in diameter than the central region 62a, where screw threads are formed, and having no screw thread formed thereon are formed on both ends of the zero point adjusting screw 62, and, additionally, on the outer sides of these straight parts 63a and 63b are formed a flange part 64 having a large diameter and a jig engaging part 65. These are formed into a construction in which they are supported in a manner permitting their rotating motion in the through-hole 60 in the sliding case 56 but are prevented from falling out of the sliding case 56.

When the aiming screw 20 is rotated, the screw holding nut 52 to which the male screw part 20b of the aiming screw 20 is threadedly engaged is made to slide towards the sliding case 56. However, since the screw holding nut 52 and the sliding case 56 are fixed against their movement in the axial direction by may of the zero point adjusting screw 62, the screw holding nut 52 and the sliding case 56 slide as a block along the guide member 54. In other words, the screw holding nut 52 and the sliding case 56 form the sliding member 51, which slides with the rotation of the aiming screw 20, and, consequently, the movement of the reflector 4 can be judged by the amount of movement on the scale 55 at the position of the reference point 59. With the position of the zero point set up for the scale 55 in advance in the position of the reference point, it is, therefore, possible to find from the scale 55 the manner of the inclination of the reflector 4.

Also, as regards the amount of movement on the scale 55, the amount of movement of the reflector 4 will be $P_2/P_1$ times the amount of movement of the aiming screw 20 since the pitch $P_2$ of the male screw part 20b of the aiming screw is larger than the pitch $P_1$ of the male screw part 20a. Therefore, the movement of the reflector 4 is indicated as magnified on the scale, which offers the advantage that it is much easier to read the scale and to obtain a higher degree of measuring precision.

When the zero point adjusting screw 62 is rotated, the screw holding nut 52, which is threadedly engaged with the screw 62, will be caused to move along the zero point adjusting screw 62. However, as the screw holding nut 52 is threadedly engaged also with the aiming screw 20, the screw holding nut cannot slide, and, on the contrary, the zero point adjusting screw 62 slides towards the screw holding nut 52. Then, as the zero point adjusting screw 62 is supported in the through-hole 60 of the sliding case 56, the sliding case 56 and the zero point adjusting screw 62 can slide along the guide member 54, thereby moving the position of the reference point 59 along the scale 55. Therefore, the position of the zero point 55a on the scale 55 is set in agreement with the position of the reference point 59 (i.e., to adjust the zero point) using the zero point adjusting screw 62 when the reflector 4 is in a proper position in the rightward-leftward direction.

Next, an example of the procedure for assembling this first inclination measuring device 50 with the aiming screw 20 will be described with reference to FIG. 7.

First, the zero point adjusting screw 62 is pushed from the side of the opening in the sliding case 56, and the zero point adjusting screw 62 is set in engagement in the through-hole 60, and then the screw holding nut 52 is pushed from the side of the opening in the sliding case 56, and the nut 52 is engaged with the sliding case 56, the female screw part 61 of the nut 52 being thereby threadedly engaged with the zero point adjusting screw 62. Next, the guide member 54 is assembled with the horizontal arm part 57. Then, the opening in the screw holding nut 52, which is assembled into the sliding case 56 is pushed and set into the prescribed position of the male screw part 20b on the aiming screw 20. Then, by fixing the guide member 54 on the lamp body 2 with screws, the installation of the inclination measuring instrument 50 is completed.

In FIGS. 2 through 4, reference numeral 70 denotes a level gauge, which is a second inclination measuring device for measuring the inclination of the reflector in the upward-downward direction, namely, the inclination of the irradiating angle of the headlamp in the upward-downward direction. This level gauge is installed on the right side end part on the upper wall of the reflector. The level gauge 70 contains a straight-line type air bubble vial 80 set inside a box-shaped case 72 having an opening in its upper area, and the position where the scale is indicated on the air bubble vial 80 is exposed through the opening 76 in the lid 74. Reference numeral 82 denotes the scale on the air bubble vial, reference numeral 82a denotes the position of the zero point on the scale, and reference numeral 83 denotes the air bubble.

The air bubble vial 80 is arranged inside the case 72 in such a manner that the scale 82 on the bubble vial crosses the horizontal axis Lx at right angles, and consequently the inclination of the reflector 4 around the horizontal axis Lx is expressed as the amount of deviation of the air bubble 83 in relation to the scale 82. Also, reference numeral 78 denotes the zero point adjusting scale. It is possible to adjust (i.e., the zero point adjustment) the position of the air bubble in the air bubble vial 80 by adjusting the screw 78.

Reference numeral 90 in FIG. 3 indicates a transparent observation port formed in the region corresponding to the level gauge 70 set on the upper wall of the lamp body. In specific terms, an opening is made in the lamp body 2 and a transparent cap 92 having a convex lens construction is mounted on this opening. Thus, by the convex lens effect of the transparent cap 92, the air bubble 83 in the air bubble vial 80 and the scale 82 are magnified for observation, so that it is thereby made easy to read the position of the air bubble, namely, to read the amount of inclination of the reflector 4 in the upward-downward direction, through the observation port 90.

Next, the procedure for adjustment of the inclination measuring devices 50 and 70 when the headlamp is mounted on the vehicle body and the procedure for the subsequent adjustment of the irradiating angle of the headlamp will be described.

The headlamp unit is set so that the irradiating angle of the headlamp in the rightward-leftward direction will be in a proper position when the position of the zero point 55a on the scale 55 is aligned with the position of the reference point 59 on the first inclination measuring device 50 and the irradiating angle of the headlamp in the upward-downward direction will be in a proper position when the air bubble 83 in the level gauge 70, which is the second inclination measuring device, is at the position of the zero point 82a on the straight-line scale.

When the headlamp with these first and second inclination measuring devices 50 and 70 integrated therein is mounted on the vehicle body, the indications on the scales of the respective measuring devices will not necessarily be at the proper positions in consequence of various manufacturing and mounting tolerances. Therefore, it is necessary to adjust the scales on the first and second inclination measuring devices to set them in their proper conditions.

Next, a description will be provided of an example of this scale adjusting method.

For the first inclination measuring device 50, the automobile is positioned in a flat place, and, with a light distribution screen set up at a prescribed position ahead of the automobile, the headlamp is turned on. Then, the distribution of light from the headlamp is adjusted by rotating operations on the aiming screws 20 in such a manner that the distribution of light is set to a prescribed position with reference to the rightward-leftward direction on the light distribution screen (so that the irradiating axis l of the headlamp is in alignment with the wheel axis). At this time, however, the position of the reference point 59 and the position of the zero point 55a on the scale are not in agreement because of such factors as deviations in the surface of the vehicle body on which the headlamp is installed. Therefore, the position of the zero point 55a on the scale is aligned with the position of the reference point 59 by sliding the sliding case 56 along the guide member 54 by rotating the zero point adjusting screw 62. Thus, with the irradiating angle of the headlamp in the rightward-leftward direction kept in its proper position, adjustments are made in such a manner that the indicated position of the reference point 59 on the first inclination measuring device 50 is at the zero point 55a on the scale.

An adjustment is also made of the level gauge 70, which is the second inclination measuring device, by rotating the upward-downward direction aiming screw 30 in such a manner that the "hot" zone of the headlamp is at the proper position in the upward-downward direction on the light distribution screen. However, because of such factors as manufacturing deviations in the surface of the vehicle body on which the headlamp is installed, the position of the air bubble may not be in agreement with the position of the zero point 82a on the scale 82 in some cases. Then, in such a case, an adjustment is carried out by rotating the zero point adjusting screw 78 in such a manner that the air bubble 83 is aligned with the position of the zero point 82a on the scale. When the irradiating angle of the headlamp in the upward-downward direction is thus kept in its proper position, an adjustment is made in such a manner that the air bubble in the level gauge 70, which is the second inclination measuring device, will indicate the zero point 82a on the scale.

Thereafter, the irradiating angle of the headlamp is adjusted at the user's side. In case the position of the reference point 59 does not indicate the position of the zero point 55a, or in case the air bubble in the level gauge 70, which is the second inclination measuring device, deviates from the position of the zero point 82a, it is possible to read from such an amount of deviation the amount of inclination of the reflector 4 in the rightward-leftward direction or in the upward-downward direction, namely, the amount of deviation of the irradiating angle of the headlamp in the rightward-leftward direction or in the upward-downward direction. In such a case, adjustments should be made by rotating the aiming screw 20 or the aiming screw 30, as the case may be, in such a manner that the position of the zero point 55a on the scale is aligned with the position of the reference point 59 in the first inclination measuring device 50 and in such a manner that the air bubble is aligned with the position of the zero point 82a on the scale in the level gauge 70, which is the second inclination measuring device. With operations performed in this manner, it is possible to make simple adjustments of the irradiating angle of the headlamp in the rightward-leftward direction or in the upward-downward direction.

Figure 10:
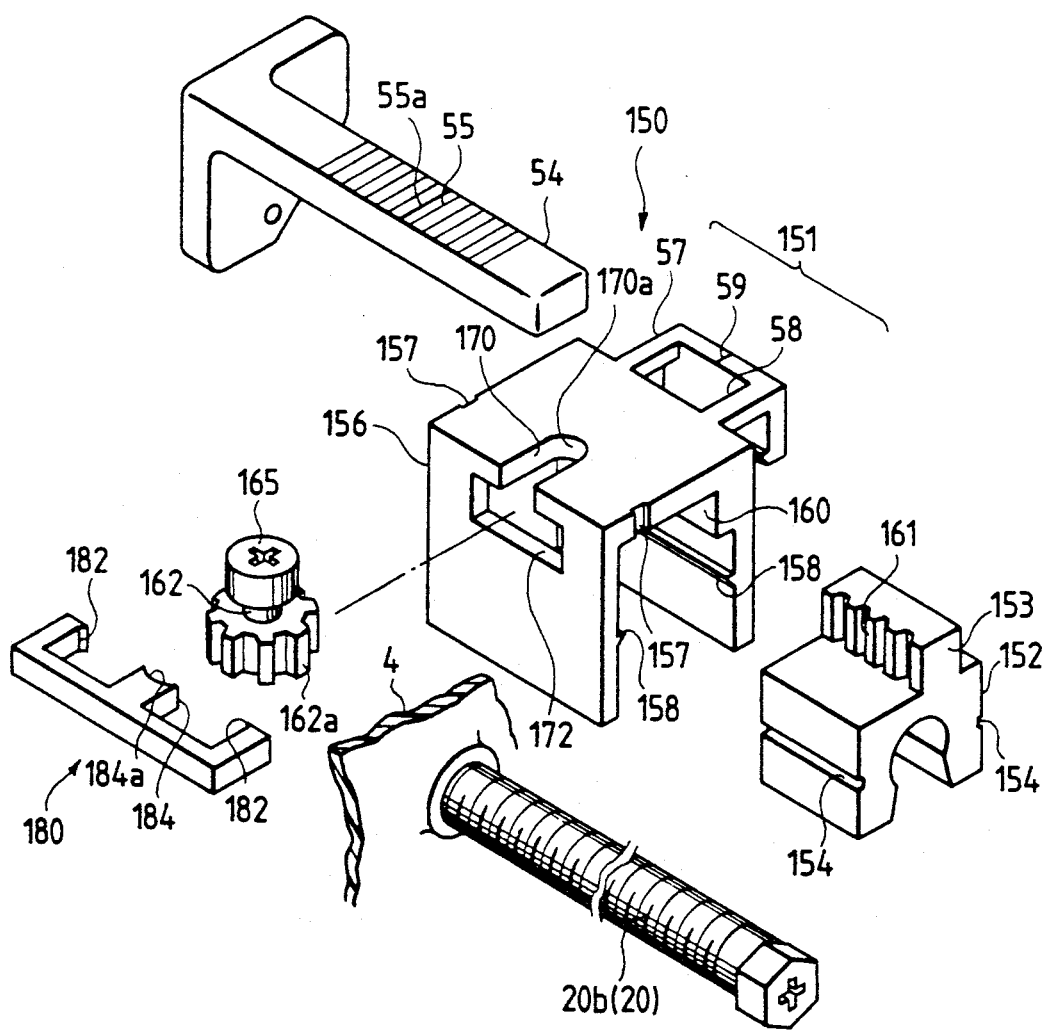
FIG. 10 is a disassembly oblique view of the same inclination measuring device.
Figure 11:
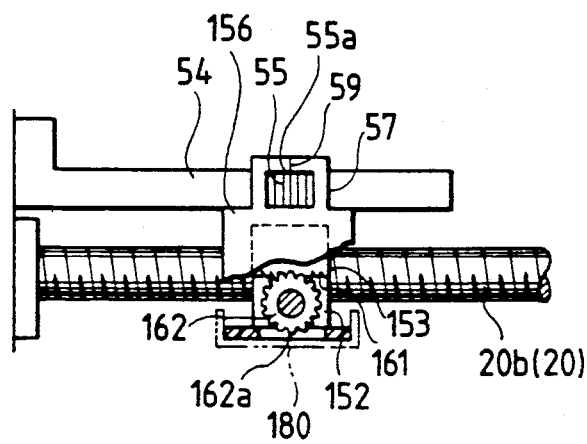
FIG. 11 is a plane view presenting in cut-away one part of the area in the proximity of the position for the installation of the same inclination measuring device.
Figure 12:
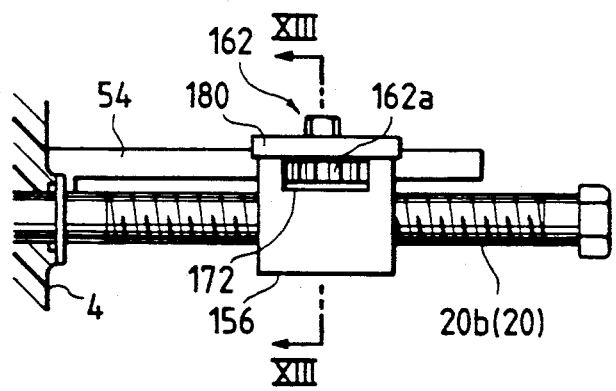
FIG. 12 is a side view of the same inclination measuring device.
Figure 13:
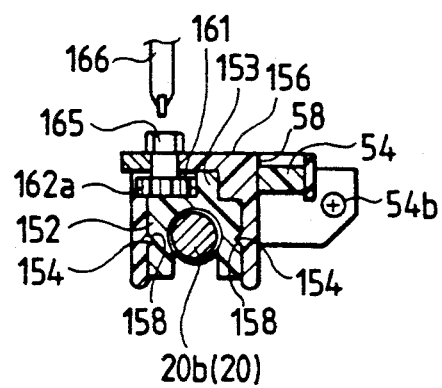
FIG. 13 is a horizontal sectional view of the same inclination measuring device (a sectional view showing the measuring device along the line XIII—XIII shown in FIG. 12)

FIG. 10 through FIG. 13 illustrate another preferred embodiment of the inventive inclination measuring device which measures the inclination of the irradiating angle of the headlamp in the rightward-leftward direction. FIG. 10 is a disassembled oblique view of the inclination measuring device. FIG. 11 is a plane view illustrating one part of the same inclination measuring device in the proximity of the position of its installation. FIG. 12 is a side view of the same inclination measuring device. FIG. 13 is a cross-sectional view of the same inclination measuring device (a sectional view showing the device along the line XIII—XIII shown in FIG. 12).

In these drawings, reference numeral 156 indicates a sliding case. A rectangular through-hole 160 extending in the forward-rearward direction is formed in this sliding case 156, and a rack 161 is formed on the side surface of an upper protrusion 153 from a screw holding nut 152 arranged in the through-hole 160. Then, a pinion 162a on the pinion shaft 162 for the adjustment of the zero point, which protrudes upward, being supported with the upper area wall of a sliding case 156, is engaged with this rack 161. The pinion shaft 162 is designed so that it can be rotated with a screwdriver 166 (FIG. 13) inserted into the jig engaging part 165 formed in the upper end of the pinion shaft 162. Thus, when the pinion shaft 162 is rotated, the rack 161, which is engaged with the pinion 162a, namely, the screw holding nut 152, will be caused to slide towards the sliding case 156. However, the screw holding nut 152 cannot move as it is threadedly engaged with the aiming screw 20. The sliding case 156 slides towards the screw holding nut 152 due to the rotating motion of the pinion shaft 162, and the sliding case 156 and the pinion shaft 162, therefore, slide along the guide member 54. Consequently, the position of the reference point, which is attached to a horizontal arm 57, slides along a scale 55, which is attached to the guide member 54, making it possible to make a zero point adjustment.

In this regard, reference numeral 170 denotes a notched part formed in the sliding case 156 for the arrangement of the pinion shaft, and an opening 172, which is the space for the arrangement of the pinion connected to this notched part 170. Reference numeral 180 represents a holder set on the sliding case 156 and arranged on the outer side of the notched part 170 and a convex part 182, which is engaged with the concave parts 157 and 157 on the sliding case side, is formed in both ends of the holder in the longitudinal direction. Also, in the central part of the holder 180 in the longitudinal direction there is formed an engaging part 184, which engages with the notched part 170 of the sliding case 156. The circular area 184a on the top of this engaging part 184 is designed to support the pinion shaft 162, working together with a circle-shaped circumferential edge part 170a of the notched part 170. Reference numerals 158 and 158 denotes a pair of horizontal convex thread parts formed in opposite positions inside the nut engaging part in the sliding case 156, and, on the outside surface of the screw holding nut 152 are formed horizontal concave thread parts 154 and 154, which are to be set into engagement with these horizontal convex thread parts 158 and 158.

This, in the inclination measuring device 150 disclosed in this embodiment, the sliding member 151 is comprised of a screw holding nut 152, which is threadedly engaged with the aiming screw 20, a sliding case 156, which is assembled in a manner permitting its sliding motion with both of the guide member 54 and the screw holding nut 152, and a zero point adjusting pinion shaft 162, which is set between the two, i.e. 54 and 156. In the other respects, this embodiment is identical to the first-described embodiments, and hence a further description of common elements, which are identified by like reference numerals, will be omitted.

In this embodiment, the pinion shaft 162 for the adjustment of the zero point extends upward of the sliding case 156, forming a construction whereby the pinion shaft 162 can be rotated from the upper area of the lamp body. Hence, the construction shown in this example offers great ease in the adjustment of the zero point.

Figure 14:
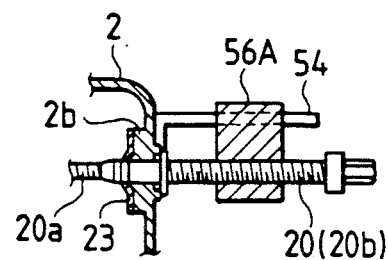
FIG. 14 is a vertical sectional view of the principal parts of the first inclination measuring device in still another example of embodiment.

Furthermore, the two embodiments described above respectively provide the construction of an inclination measuring device which, having a sliding member 51 (151) comprised of a screw holding nut 52 (152) threadedly engaged with an aiming screw 20, a sliding case 56 (156) assembled in a manner permitting its sliding motion with both of a guide member 54 and the screw holding nut 52 (152), and a zero point adjusting screw 62 (a zero point adjusting pinion shaft 162), performs the adjustment of the zero point on the scale by rotating the zero point adjusting screw 62 (or the zero point adjusting pinion shaft 162). However, as illustrated in FIG. 14, the inclination measuring device may have a construction in which a sliding case 56A, which is a sliding member, is threadedly engaged directly with a male screw part 20b of an aiming screw 20. Since it is not possible to make any zero adjustment in this case, the zero point should be set by putting a mark on the position of a prescribed reference point for the position of an appropriate irradiating angle for the lamp and the position of the scale.

Figure 15:
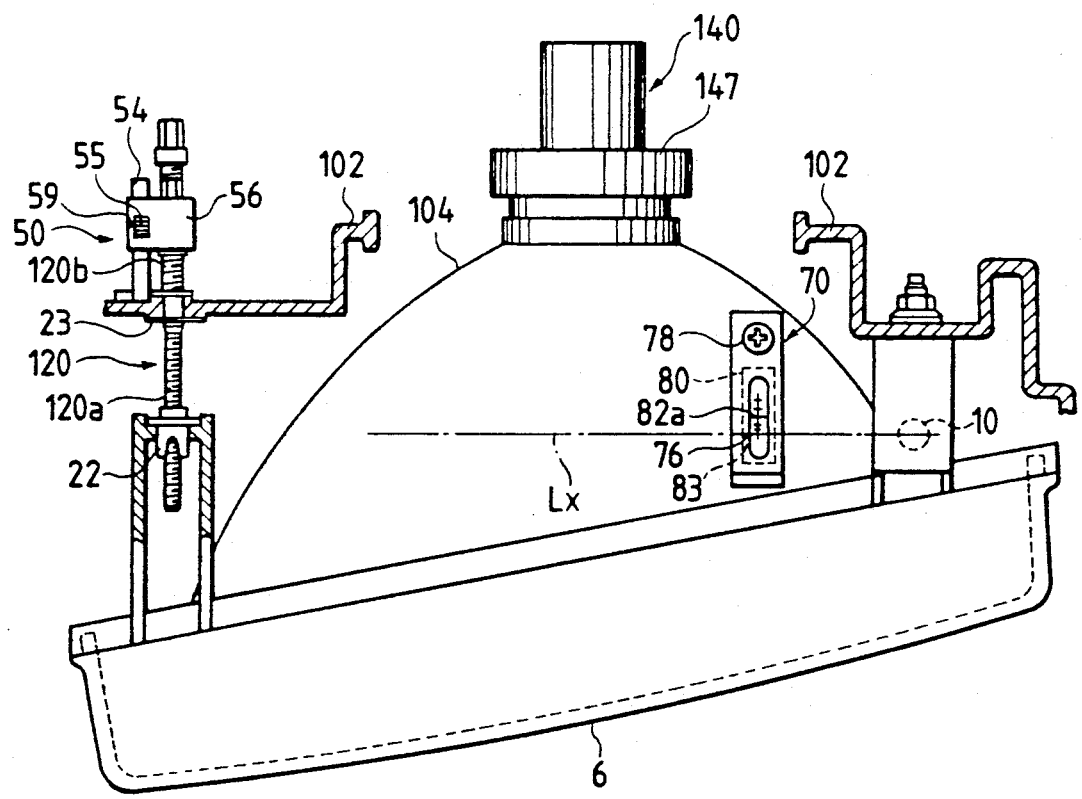
FIG. 15, which shows an example of embodiment in which the present invention is applied to a movable-unit type headlamp, presents a plane view of the headlamp showing a part in cut-away.

FIG. 15 illustrates an example which features the application of the present invention to a movable-unit type headlamp of which the base member is a lamp housing and the tiling member is a lamp body and reflector unit (hereinafter referred to as a "lamp body unit"). A first inclination measuring device 50, which measures the inclination of the irradiating angle of the headlamp in the rightward-leftward direction, is installed between the male screw part 120b of the rightward-leftward direction aiming screw, which protrudes into the area in the rear of a lamp housing 102, and the lamp housing 102. Also, a level gauge 70, which is a second inclination measuring device which measures the inclination of the irradiating angle cf the headlamp in the upward-downward direction, is mounted on the upper area wall of the lamp body unit 104. The first inclination measuring device 50 and second inclination measuring device 70 have a construction identical to that of the measuring device shown in respect of the movable-reflector type headlamp described above, and hence a further detailed description of their construction will be omitted here, the same reference marks being applied to the corresponding parts. In FIG. 15, moreover, reference numeral 140 indicates a bulb socket, and reference numeral 147 represents a locking cap which rigidly sets the bulb socket 140 in a socket hole in the lamp body unit.

As it is clear from the description given hereinabove, the automobile headlamp according to the present invention indicates the inclination of the tilting member (which is the reflector in a movable-reflector type headlamp and the lamp body and reflector unit in a movable-reflector unit type headlamp) in the rightward-leftward direction in relation to the base member (which is the lamp body in a movable-reflector type headlamp and the lamp housing in a movable-unit type headlamp) in terms of a change on the scale on an inclination measuring device installed between the rightward-leftward aiming screw and the base member, making it possible to read the amount of inclination of the tilting member in the rightward-leftward direction, namely, the amount of inclination of the irradiating angle of the headlamp, from a change on this scale.

Also, in order to adjust the irradiating angle of the headlamp in the rightward-leftward direction for a correction of a deviation, it is sufficient to make such adjustment by tilting the tilting member in the rightward-leftward direction by rotating the rightward-leftward aiming screw in such a manner that the scale of the inclination measuring device will be in the prescribed position. Accordingly, it is thereafter easy and simple to adjust the irradiating angle of the headlamp in the rightward-leftward direction.

Moreover, the inclination measuring device, which is comprised of a guide member and a sliding member, is constructed so that it is set between the rearward protrusion from the base member and the base member of the rightward-leftward aiming screw and hence does not require any processing word at all, such as hole-making, for the arrangement of the inclination measuring device in the base member.

Furthermore, the arrangement of the inclination measuring device in the area in the rear of the base member offers greater ease in reading the scale, and permits a lower height of the headlamp in the upward-downward direction, thereby realizing a thinner shape of the lamp, and attains the additional advantage that it requires a smaller installation space in the upward-downward direction.

The present invention makes it possible to adjust the headlamp in the rightward-leftward direction with considerable easy in a very simple manner because it permits adjustment of the zero point on the scale by rotating the zero point adjusting screw or the zero point adjusting shaft, as the case may be.

Moreover, a zero point adjusting shaft protruding upward at the rear area side of the base member offers the operator the beneficial effect of easy adjustment of the zero point.

Figure 16:
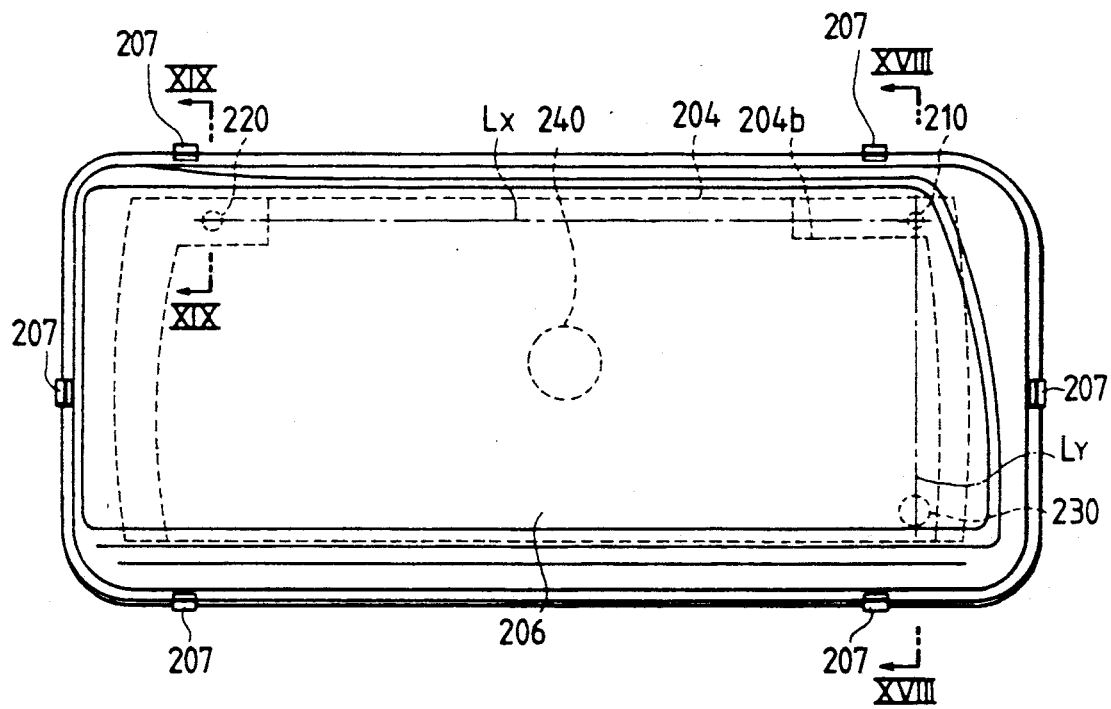
FIG. 16 illustrates a front view of the headlamp of another embodiment of the invention.
Figure 17:
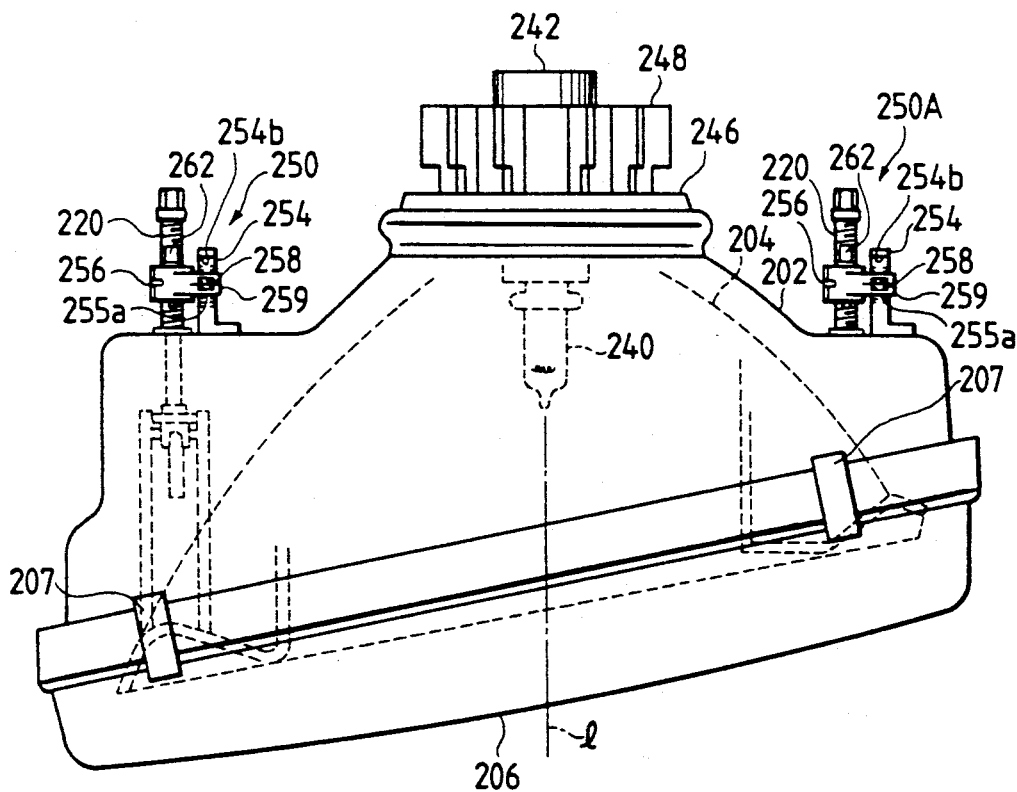
FIG. 17 is a plane view of the headlamp of FIG. 16.
Figure 18:
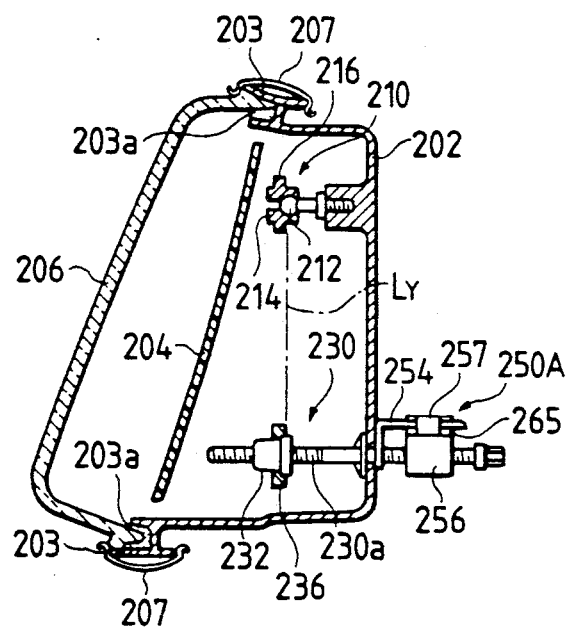
FIG. 18 shows a vertical sectional view of the headlamp of FIG. 16.
Figure 19:
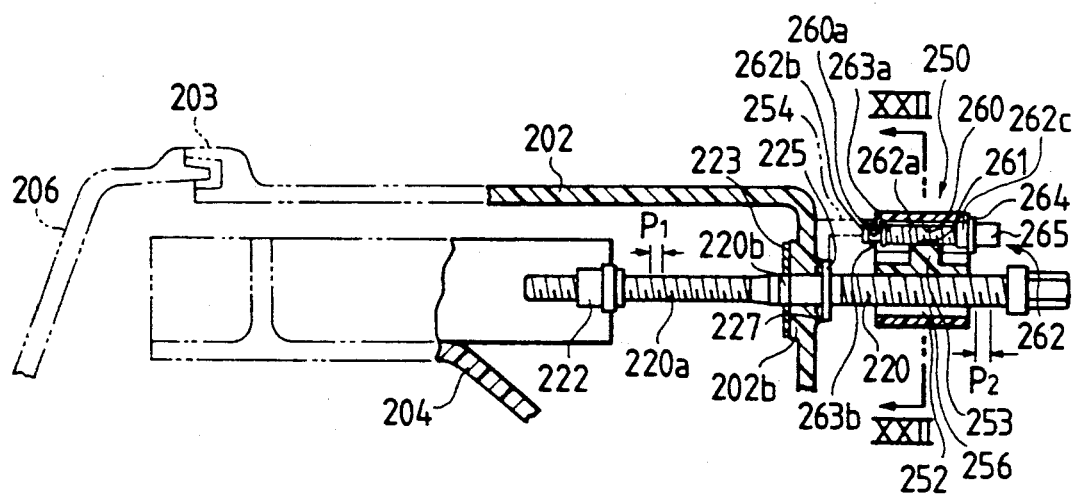
FIG. 19 is a vertical sectional view of the area in the proximity of the position of installation of the inclination measuring device, which measures the inclination of the irradiating angle of the head lamp in the rightward-leftward direction, and is an enlarged sectional view along the line XIX—XIX shown in FIG. 16.
Figure 20:
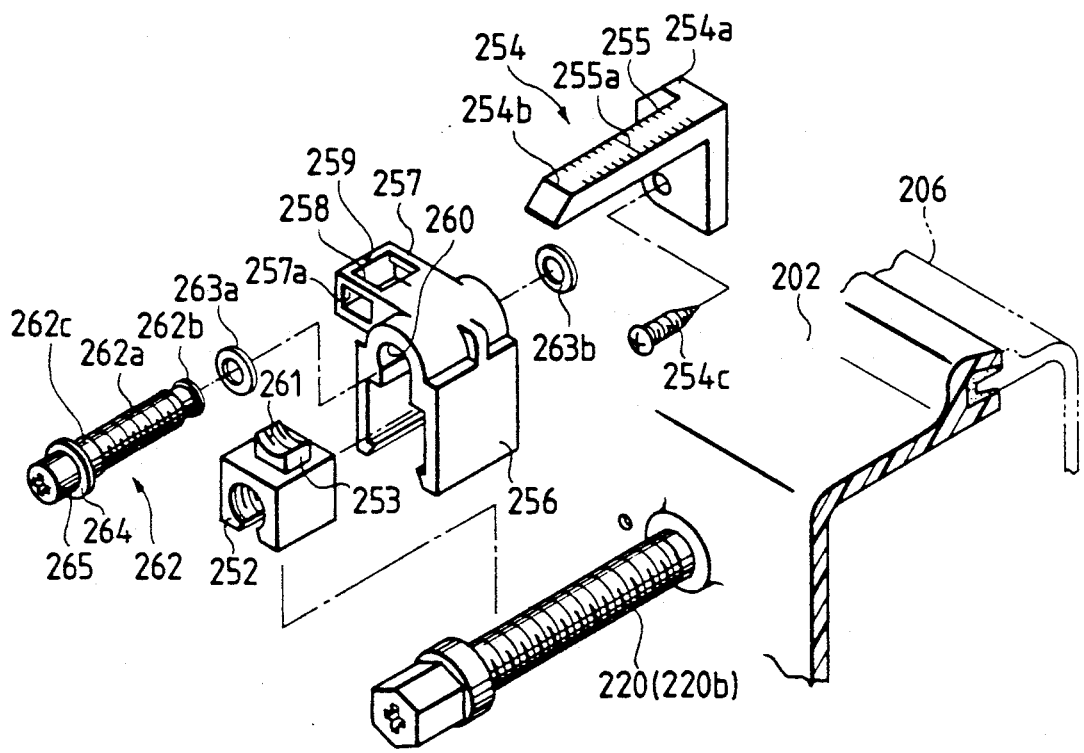
FIG. 20 shows a disassembled oblique view of the same inclination measuring device.
Figure 21:
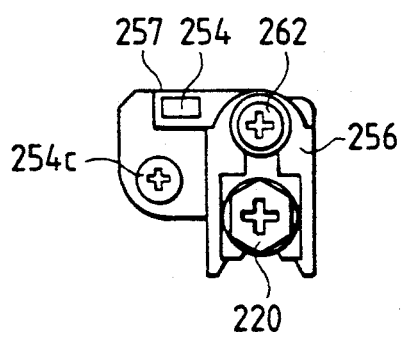
FIG. 21 is a rear view of the same inclination measuring device.
Figure 22:
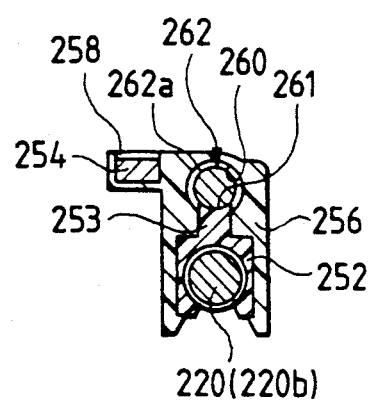
FIG. 22 is a horizontal sectional view of the same inclination measuring device, and is a sectional view along the line XXII—XXII in FIG. 19.

FIG. 16 through FIG. 22 illustrate further embodiments in which the present invention is applied to a movable-reflector type headlamp, of which the base member is a lamp body and the tilting member is a reflector. FIG. 16 shows a front view of a movable-reflector type headlamp with an irradiating angle adjusting device installed therein. FIG. 17 is a plane view of the same headlamp. FIG. 18 is a vertical sectional view of the same headlamp (a sectional view illustrating the headlamp along the line XVII—XVII in FIG. 16). FIG. 19 is a vertical sectional view of the area in the proximity of the position of installation of the inclination measuring device, which measures the inclination of the irradiating angle of the headlamp in the rightward-leftward direction (an enlarged sectional view illustrating the headlamp along the line XIX-XIX shown in FIG. 16). FIG. 20 is a disassembled oblique view of the same inclination measuring device. FIG. 21 is a rear view of the same inclination measuring device. FIG. 22 is a cross-sectional view of the same inclination measuring device (a sectional view illustrating the lamp along the line XXII—XXII shown in FIG. 19).

In these drawings, reference numeral 202 indicates a lamp body having generally a container shape. A reflector 204 is disposed within the lamp body, and, with a front lens 206 set in the rectangle-shaped front opening in the lamp body, this lamp body is formed into an integrated headlamp unit.

As shown in FIG. 16 through FIG. 15, a reflector 204 is supported at three points, namely, by a ball joint 210, a rightward-leftward direction aiming screw 220, and an upward-downward direction aiming screw 230. The side of the spherical part 212 of the ball joint 210 is supported on the side of the lamp body 202, forming a construction in which the reflector 204 can swing around this ball joint 210 as the center of its motion. The aiming screws 220 and 230 are respectively supported on the lamp body 202 in such a manner that they can rotate freely, and the male screw parts 220a and 230a on the forward ends of the aiming screws 220 and 230, respectively, are threadedly engaged with the nuts 222 and 232 on the side of the reflector 204. A socket 214, which bears the spherical part 212, is held rigidly on a bracket 216 protruding from the rear side of the reflector 204, and the nuts 222 and 232, which are threadedly engaged with the male screw parts 220a and 230a, are held rigidly on brackets 226 and 236 protruding from the rear side of the reflector 204. Thus, by rotating the aiming screws 220 and 230, the nuts 222 and 232 are moved forward and rearward along the aiming screws 220 and 230, and the inclination of the reflector 204 is thereby changed.

In other words, the supporting point formed for the reflector 204 by the rightward-leftward direction aiming screw 220 (the threadedly engaged parts of the aiming screw 220 and the nut 222) is at right angles with the irradiating axis l of the headlamp (FIG. 17) and is positioned on the horizontal axis Lx, which passes through the ball joint 210, and the supporting point formed for the reflector 204 by the upward-downward direction aiming screw 230 (the threadedly engaged parts of the aiming screw 230 and the nut 232) is at right angles with the irradiating angle l of the headlamp and is positioned on the vertical axis Ly, which passes through the ball joint 210. Consequently, rotating the aiming screw 220 moves the nut 222 forward and rearward along the screw 220, so that the reflector 204 tilts around the vertical axis Ly, making it possible to adjust the inclination of the reflector 204, which is the tilting member, in relation to the lamp body 202, which is the base member, namely, the irradiating angle of the headlamp in the rightward-leftward direction can thereby be adjusted. Rotation of the aiming screw 230 moves the nut 232 forward and rearward along the screw 230, so that the reflector 204 tilts around the horizontal axis Lx which crosses the vertical axis Ly at right angles, making it possible to adjust the inclination of the reflector 204, which is the tilting member, in relation to the lamp body 202, which is the base member, in the upward-downward direction, namely, the irradiating angle of the headlamp in the upward-downward direction can thereby be adjusted. In this manner, adjusting the two aiming screws 220 and 230 make it possible to adjust the inclination of the reflector 204, namely, to adjust the irradiating angle of the headlamp.

Also in FIG. 17, reference numeral 240 indicates a bulb mounted in a bulb socket 242. The bulb is inserted in a bulb inserting hole (not illustrated) formed in the rear top part of the reflector 204. On the rear side of the lamp body 202, an opening 202a is formed for the attachment and detachment of the bulb socket. Furthermore, this opening 202a on the rear side of the lamp body has a rubber cover 246 thereon to close this opening. In this regard, the reference numeral 248 indicates a locking cap 247, which fixes the bulb socket 242 under pressure in the bulb inserting hole.

Moreover, in FIGS. 16 through 18, reference numeral 203 denotes a sealing groove formed in the peripheral edge of the front opening in the lamp body 202, and, with a sealing agent 203a filled inside this sealing groove 203, the legs of the front lens 206 are joined. Reference numeral 207 denotes a clip for mechanically clamping the front lens 206 and the lamp body 202.

Reference numeral 250 denotes a first inclination measuring device which, being set between the lamp body 202 and the part of the rightward-leftward direction aiming screw 220 which protrudes into the rear area of the lamp body 202, measures the rightward-leftward inclination of the reflector 204, namely, the rightward-leftward inclination of the irradiating angle of the headlamp. Its details are illustrated in FIG. 19 through FIG. 22.

The rightward-leftward direction aiming screw 220 is the lamp body 202 and is supported on the lamp body 202, being positioned in place as a snap ring 223 set in the necking part 221 of the screw shaft and a flange part 225 formed on the shaft in cooperation snap and hold the thicker part 202b of the lamp body. In addition, reference numeral 227 indicates an O-ring, which, being set between the rear surface of the lamp body 202 and the flange part 225, seals the screw supporting part. Also, on the part of the aiming screw 220 which protrudes into the rear area of the lamp body, a male screw part 220b, which has a pitch ($P_2$) larger than the pitch ($P_1$) of the male screw part 220a on the forward end side of the screw, is formed, and a bracket-shaped aiming screw holding nut 252 is threadedly engaged with this male screw part 220b. Also, behind the lamp body 202, a rod-shaped guide member 254 extends in parallel with the above-mentioned rightward-leftward direction aiming screw 220, and a straight-line scale 255 extending in the direction of the extension of the guide member 254 is formed on the upper side area of the guide member 254. Reference numeral 255a indicates the zero point on the scale 255. Reference numeral 254a denotes a bracket part on the guide member 254, and reference numeral 254b denotes a stopper part, which is formed on the upper area at the end of the protrusion of the guide member 254. The stopper part directly contacts the horizontal arm part 257 of the sliding case 256, thereby serving the purpose of preventing the sliding case 256 from falling out of its place. Reference numeral 254c denotes a mounting screw which fixes the guide member 254 on the lamp body 202.

Moreover, a sliding case 256 approximately in a gate shape is set on both of the screw holding nut 252 and the guide member 254, and the sliding case 256 is constructed so that it can slide in the forward-rearward direction in relation to any of the screw holding nut 252 and the guide member 254. Reference numeral 257 denotes a horizontal arm which forms a part of the sliding case 256 and engages with the guide member 254. In this horizontal arm 257 is formed a guide hole 257a, which is a joint part with the guide member 254. A rectangularly shaped opening 258, which can expose the area of the guide member 254 where the scale is formed, is formed in this horizontal arm part 257, and a reference point 259, which corresponds to the scale 255 on the guide member side is indicated on the edge of a side of the opening. The sliding case 256 is formed, for example, of synthetic resin by monobloc molding.

Moreover, the sliding case 256 has a through-hole 260 with an opening formed at the side of the part in engagement with the screw holding nut 252 and extending in the forward-rearward direction. A zero point adjusting screw 262 is provided in this through-hole 260. In addition, a female screw part 261 is formed on the upper end part of the upward protrusion 253 of the screw holding nut 252 set with the sliding case 256, which forms a construction with the zero point adjusting screw 262 threadedly engaged with this female screw part 261. That is to say, straight parts 263a and 263b slightly smaller in diameter than the central region 262a, where screw thread is formed, and having no screw thread formed thereon are formed on the forward end of the zero point adjusting screw 262, and, additionally, on the rear end of the zero point adjusting screw, a straight part 262c, which is aligned with the through-hole 260, a flange part 264 of large diameter, and a jig engaging part 265 are formed in succession, and these are formed into a construction such that they are prevented from falling out of the sliding case 256 while they are supported in the through-hole 260 in a manner permitting their rotating motion. Moreover, at the forward end of the screw 262, the necking part 262b is supported on the smaller diameter part 260a at the forward end side of the through-hole 260 and prevented from falling out by means of a washer 263a and a push-on fixer 263b in the shape of a plate spring which are set on the necking part 262b.

When the aiming screw 220 is rotated, the screw holding nut 252 to which the male screw part 220b of the aiming screw 220 is threadedly engaged is made to slide towards the sliding case 256. However, since the screw holding nut 252 and the sliding case 256 are fixed against movement in the axial direction by way of the zero point adjusting screw 262, the screw holding nut 252 and the sliding case 256 slide in one block along the guide member 254. In other words, the screw holding nut 252 and the sliding case 256 together form the sliding member 251, which slides with the rotation of the aiming screw 220. Consequently, the amount of movement of the reflector 204 is manifest as the amount of movement on the scale 255 at the position of the reference point 259 and, with the position of the zero point set for the scale 255 in advance in the position of the reference point, it is, therefore, possible to judge from the scale 255 the amount of the inclination of the reflector 204. Also, as regards the amount of movement on the scale 255, the amount of movement of the reflector 204 will be $P_2/P_1$ times the amount of movement of the aiming screw 220 since the pitch $P_2$ of the male screw part 220b of the aiming screw is larger than the pitch $P_1$ of the male screw part 220a. Therefore, the movement of the reflector 204 is indicated as magnified on the scale, which offers the advantage that it is much easier to read the scale and additionally to obtain a higher degree of measuring precision.

When the zero point adjusting screw 262 is rotated, the screw holding nut 252, which is threadedly engaged with the screw 262, will be moved along the zero point adjusting screw 262. However, as the screw holding nut 252 is threadedly engaged also with the aiming screw 220, the screw holding nut cannot slide, and, on the contrary, the zero point adjusting screw 262 slides towards the screw holding nut 252. Then, as the zero point adjusting screw 262 is supported in the through-hole 260 of the sliding case 256, the sliding case 256 and the zero point adjusting screw 262 can slide along the guide member 254, thereby moving the position of the reference point 259 along the scale 255. Therefore, the position of the zero point 255a on the scale 255 is aligned with the position of the reference point 259 (i.e., to carry out adjustment of the zero point) using the zero point adjusting screw 262 when the reflector 204 is in a proper position in the rightward-leftward direction.

Next, an example of the procedure for assembling the inclination measuring device 250 with the aiming screw 220 will be described with reference to FIG. 21.

First, the screw holding nut 252 is engaged by sliding the nut into the sliding case 256. Then, the zero point adjusting screw 262 with the washer 263a placed thereon is pushed into the through-hole of the sliding case while the screw is threadedly engaged with the female screw part 261 of the nut 252, and the forward end part of the screw 262 is supported with the fixer 263b. Next, the guide member 254 is inserted into the guide hole 257a in the horizontal arm part 257, and the guide member 254 is thereby assembled into the sliding case 256. Next, the opening in the screw holding nut 252 in the sliding case 256 is pushed into the prescribed position of the male screw part 220b of the aiming screw 220 and set in engagement there. Then, with the guide member 254 fixed on the lamp body 202 with screws, the installation of the inclination measuring device 250 is completed.

In FIG. 16 through FIG. 18, reference numeral 250A denotes a second inclination measuring device, which, being installed between the lamp body 202 and the part of the upward-downward direction aiming screw 230 protruding into the rear area of the lamp body 202, measures the inclination of the reflector 204 in the upward-downward direction, namely, the inclination of the irradiating angle of the headlamp in the upward-downward direction. As its construction is identical to that of the first inclination measuring device described above, a further detailed description will be omitted, with like elements being applied to the identical parts of this inclination measuring device.

Next, a description will be given of the procedure for adjusting the inclination measuring devices 250 and 250A when the headlamp is mounted on a vehicle body, and the subsequent adjustment procedure to be carried to properly set the irradiating angle of the headlamp.

The headlamp unit is set so that the irradiating angle of the headlamp in the rightward-leftward direction and the irradiating angle of the headlamp in the upward-downward direction are proper when the position of the zero point 255a on the scale 255 is aligned with the position of the reference point 259 on the first inclination measuring device 250 and that on the second inclination measuring device 250A.

Then, when the headlamp with these first and second inclination measuring devices 250 and 250A integrated therewith is mounted on the vehicle body, the indications on the scales in the respective measuring devices will generally not be at the proper positions in consequence of various manufacturing tolerances. Therefore, it is necessary to adjust the scales of the first and second inclination measuring devices.

Next, a description is made of an example of this scale adjusting method.

First, the automobile is positioned on a flat place, and, with a light distribution screen set up in a prescribed position ahead of the automobile, the headlamp is turned on. Then, the distribution of light from the headlamp is adjusted by rotating the aiming screws 220 and 230 in such a manner that the distribution of light is at a prescribed position with reference to the upward-downward direction and the rightward-leftward direction on the light distribution screen. At this time, however, the position of the reference point 259 and the position of the zero point 255a on the scale generally will not be in agreement in the respective inclination measuring devices because of factors such as a deviations in the surface of the vehicle body on which the lamp is mounted. Therefore, the position of the zero point 255a on the scale is made to align with the position of the reference point 259 by sliding the sliding case 256 along the guide member 254 by rotating the zero point adjusting screw 262. With the irradiating angles of the headlamp in the upward-downward direction and in the rightward-leftward direction kept in their proper positions, adjustments are carried out in such a manner that the indicated position of the reference point 259 on the first inclination measuring device 250 and that of the reference point 259 on the second inclination measuring device 250A are aligned with the zero point 255a on the scale.

Thereafter, the irradiating angle of the headlamp is adjusted at the user's side. Specifically, in case the position of the reference point 259 deviates from the position of the zero point 255a, it is possible to determine from such an amount of deviation the amount of inclination of the reflector 4 in the rightward-leftward direction or in the upward-downward direction, namely, the amount of deviation of the irradiating angle of the headlamp in the rightward-leftward direction or in the upward-downward direction. In such a case, adjustments should be made by rotating the aiming screw 220 or the aiming screw 230, as the case may be, in such a manner that the position of the zero point 255a on the scale aligns with the position of the reference point 259. With operations performed in this manner, it is possible to make simple adjustments of the irradiating angle of the headlamp in the rightward-leftward direction or in the upward-downward direction.

Figure 23:
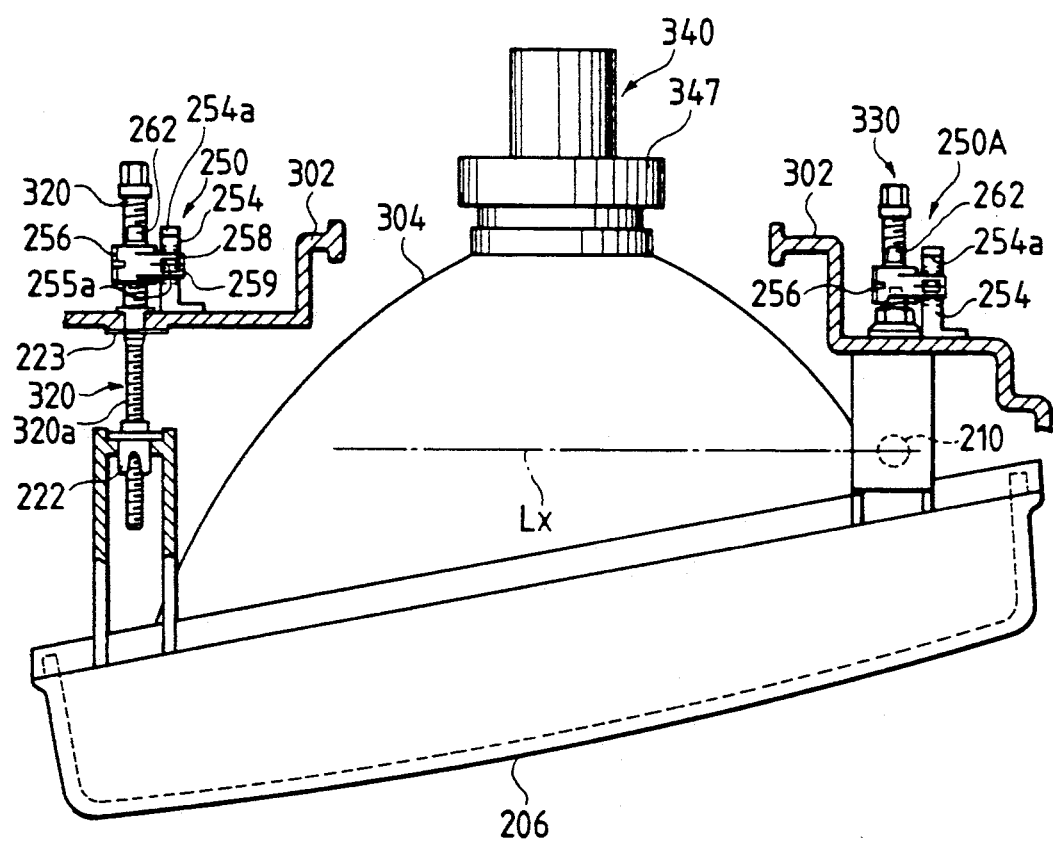
FIG. 23 is a plane view of the headlamp, with parts cut away, in an example in which the present invention is applied to a movable-unit type headlamp.

FIG. 23 illustrates another embodiment in which the present invention is applied to a movable-unit type headlamp of which the base member is a lamp housing and the tilting member is a lamp body and reflector unit.

A first inclination measuring device 250, which measures the inclination of the irradiating angle of the headlamp in the rightward-leftward direction, is installed between the male screw part 320b of the rightward-leftward direction aiming screw, which protrudes into the area in the rear of a lamp housing 302, and the lamp housing 302. Also, a second inclination measuring device 250A, which measures the inclination of the irradiating angle of the headlamp in the upward-downward direction, is installed between the male screw part of the upward-downward direction aiming screw 330, which protrudes into the area in the rear of the lamp housing 302, and the lamp housing 302. The first inclination measuring device 250 and the second inclination measuring device 250A have a construction identical to that of the inclination measuring device described with respect to the movable-reflector type headlamp described above. Further in FIG. 23, reference numeral 340 indicates a bulb socket, and reference numeral 347 represents a locking cap which rigidly sets the bulb socket 340 in a bulb inserting hole formed in the lamp body unit.

As it is clear from the description above, the automobile headlamp according to the present invention indicates the inclination of the tilting member (which is the reflector in a movable-reflector type headlamp and the lamp body and reflector unit in a movable-unit type headlamp) in relation to the base member (which is the lamp body in a movable-reflector type headlamp and the lamp housing in a movable-unit type headlamp) in terms of a change on the scale on the inclination measuring device installed between the aiming screw and the base member, making it possible to read the amount of inclination of the tilting member, namely, the amount of inclination of the irradiating angle of the headlamp, from a change on this scale.

Also, in order to adjust the irradiating angle of the headlamp for a correction of its deviation, it is sufficient to carry out such adjustment by rotating the aiming screw in such a manner that the scale of the inclination measuring device is at the prescribed position. Also, it is possible to adjust the zero point on the scale by rotating the zero point adjusting screw. Therefore, the operator can easily and simply adjust the irradiating angle of the headlamp. In addition, as the stopper on the guide member prevents the sliding case from falling out, there will not occur problems such as the sliding case falling out as the result of an error in the course of adjusting the aiming screw.

Moreover, the inclination measuring device is constructed so that it is set between the rearward protrusion from the base member and the base member and hence does not require any processing work at all, such as hole-making, for the arrangement of the inclination measuring device in the base member.

Furthermore, the arrangement of the inclination measuring device in an area in the rear of the base member offers greater else in the reading of the scale and achieves a lower height of the headlamp in the upward-downward direction, thereby realizing a thinner shape of the lamp, and produces the additional advantage that it needs a smaller space in the upward-downward direction for its installation on the vehicle body.

What is claimed is:

1. A movable tilting-member type automotive headlamp in which the irradiating angle of the headlamp is adjusted with a tilting member provided with a light reflecting surface for setting the irradiating direction of the lamp, the tilting member being supported at three points including one swing support part supported on a base member, a rightward-leftward direction aiming screw penetrating through the base member in the forward-rearward direction and supported by said base member, and an aiming screw for the upward-downward direction, said tilting member being moved in the upward-downward direction and in the rightward-leftward direction in relation to the said base member by rotating said aiming screws, wherein the improvement comprises an inclination measuring device, disposed between said base member and a portion of said rightward-leftward direction aiming screw protruding into a rear area behind said base member, for measuring the rightward-leftward inclination of the said tilting member, said inclination measuring device comprising:

a guide member supported on said base member and extending approximately in parallel with said protruding portion of said rightward-leftward direction aiming screw;

a sliding member threadedly engaged with said protruding portion of said rightward-leftward direction aiming screw such that said sliding member slides relative to said guide member as said rightward-leftward direction aiming screw is rotated; and scale means for indicating an amount of relative displacement between said guide member and said sliding member.

2. The headlamp according to claim 1, wherein said sliding member comprises:

an aiming screw holding nut threadedly engaged with said rightward-leftward direction aiming screw;

a sliding case engaged with said aiming screw in a manner permitting its sliding motion with both said aiming screw holding nut and said guide member; and a zero point adjusting screw supported by said sliding case in a manner permitting its rotating motion, said zero aiming screw and threadedly engaged with a female screw part formed on said aiming screw holding nut.

3. The headlamp according to claim 1, wherein said aiming screw has a first threaded portion engaged with said base member and a second threaded portion engaged with said aiming screw holding nut, said first threaded portion having a greater thread pitch than said second portion.

4. The headlamp according to claim 2, wherein said scale means comprises a linear scale on said guide means and a reference mark on said sliding case.

5. The headlamp according to claim 2, wherein said sliding case comprises a horizontal arm portion, said guide member being slidably received within said horizontal arm portion.

6. The headlamp according to claim 2, further comprising a second inclination measuring device for measuring an amount of inclination of said tilting member in said upward-downward direction.

7. The headlamp according to claim 6, wherein said second inclination measuring device comprises a bubble vial level attached to said tilting member.

8. The headlamp according to claim 6, wherein said second inclination measuring device comprises:

a guide member supported on said base member and extending approximately in parallel with a portion of said upward-downward aiming screw protruding rearward of said base member;

a sliding member threadedly engaged with said protruding portion of said upward-downward direction aiming screw such that said sliding member slides relative to said guide member as said upward-downward direction aiming screw is rotated; and scale means for indicating an amount of relative displacement between said guide member and said sliding member.

9. The headlamp according to claim 8, wherein said upward-downward aiming screw has a first threaded portion engaged with said base member and a second threaded portion engaged with said aiming screw holding nut, said first threaded portion having a greater thread pitch than said second portion.

10. The headlamp according to claim 9, wherein said scale means comprises a linear scale on said guide means and a reference mark on said sliding case.

11. The headlamp according to claim 1, wherein said sliding member comprises:
- an aiming screw holding nut threadedly engaged with said rightward-leftward direction aiming screw;
- a sliding case engaged with said aiming screw in a manner permitting its sliding motion with both said aiming screw holding nut and said guide member; and
- a zero point adjusting shaft supported by said sliding case in a manner permitting its rotating motion and provided in such a manner as to protrude upward, said zero point adjusting shaft comprising a pinion meshing with a rack formed on said aiming screw holding nut.

12. The headlamp according to claim 11, wherein said scale means comprises a linear scale on said guide means and a reference mark on said sliding case.

13. The headlamp according to claim 1, wherein said guide member has stopper means formed on an outer end portion thereof for stopping movement of said sliding member.

14. The headlamp according to claim 1, wherein said base member is a lamp body and said tilting member is a reflector disposed within said lamp body.

15. The headlamp according to claim 1, wherein said base member is a lamp housing and said tilting member comprises a lamp body reflector unit comprising a reflector formed on an inside circumferential thereof.

* * * * *